No. 776,961. Patented December 6, 1904.

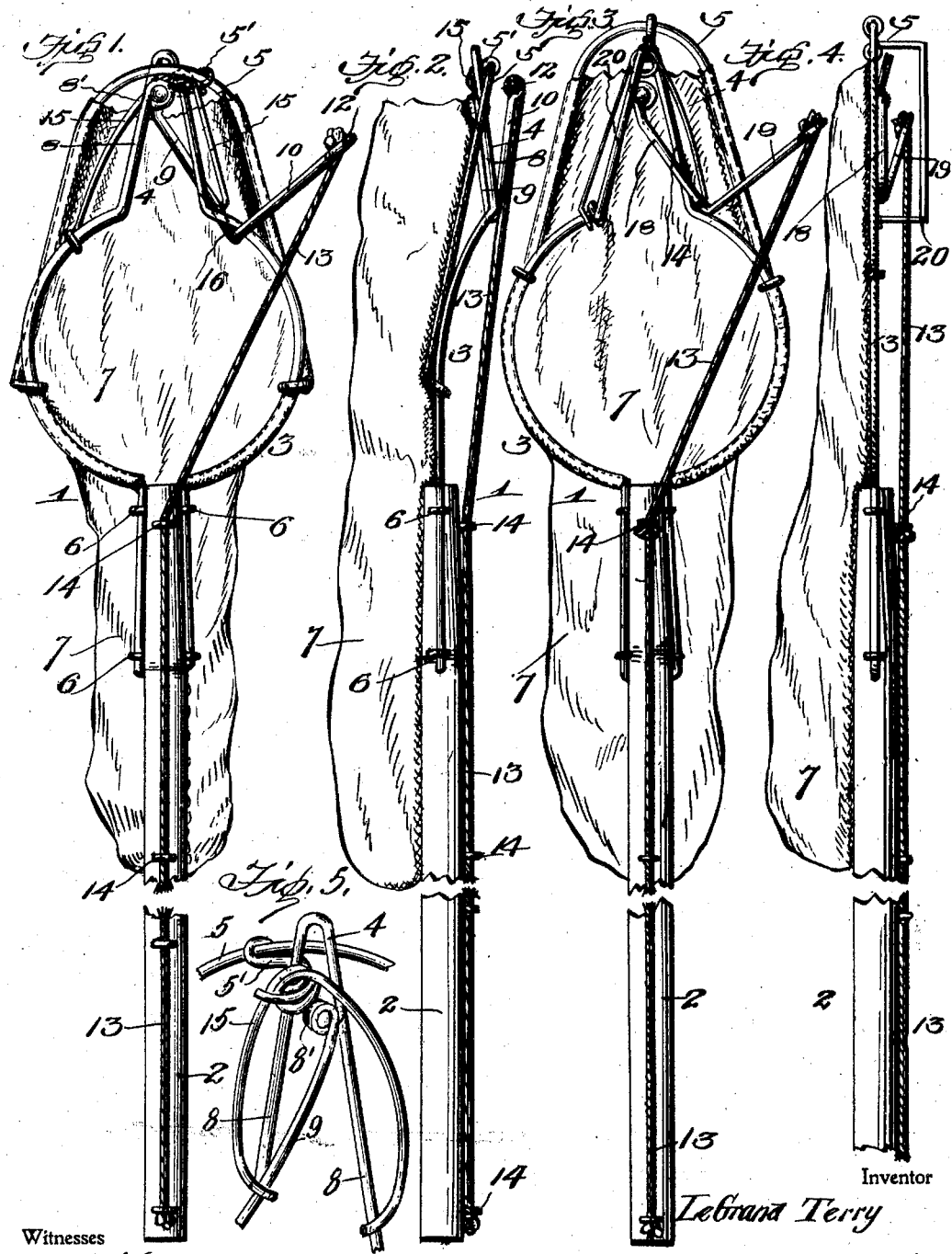

UNITED STATES PATENT OFFICE.

LE GRAND TERRY, OF WAVERLY, NEW YORK.

FRUIT-PICKER.

SPECIFICATION forming part of Letters Patent No. 776,961, dated December 6, 1904.

Application filed January 11, 1904. Serial No. 188,644. (No model.)

*To all whom it may concern:*

Be it known that I, LE GRAND TERRY, a citizen of the United States, residing at Waverly, in the county of Tioga and State of New York, have invented certain new and useful Improvements in Fruit-Pickers; and I do declare the following to be a full, clear, and exact description of the invention, such as will enable others skilled in the art to which it appertains to make and use the same.

This invention relates to improvements in fruit-pickers.

The object of the invention is to provide a fruit-picker with which fruit of all kinds may be gathered from any part of the tree without bruising or injuring the fruit or trees.

A further object is to provide a device of this character which will be simple in construction, strong and durable, and well adapted to the purpose for which it is designed.

With these and other objects in view the invention consists of certain novel features of construction, combination, and arrangement of parts, as will be more fully described, and particularly pointed out in the appended claims.

In the accompanying drawings, Figure 1 is a front view of a fruit-picker embodying the invention. Fig. 2 is a side view of the same, parts of the pocket being broken away to illustrate the construction of the frame. Fig. 3 is a front view showing a modified construction of picker. Fig. 4 is a side view of the same. Fig. 5 is a detail view showing the upper portion of the extension and the clip engaging the coil of the spring.

Referring more particularly to the drawings, 1 denotes the picker, which consists of a handle 2 of any suitable length, having secured to its upper end a frame 3, which may be of any suitable shape or form, but which is here shown as circular and having an inverted-V-shaped extension 4 at its upper end. Above the frame 3 and around the extension 4 is arranged a bail 5, the ends of which are rigidly secured to the sides of the circular frame 3 and the upper end of which is connected to the extension 4 by a hook or clip 5'. The frame 3 and bail 5 are preferably formed of stiff wire bent to the desired shape, the ends of the frame being extended along the sides of the handle, then bent at right angles and driven into the same. Staples 6 or other suitable fastening means are applied to the extended ends of the frame, as shown, to secure said ends to the handle. On the bail 5 and lower portion of the frame is attached the upper end of a bag or pocket 7, which may be of any suitable length and which is tacked or secured at one side to the handle to prevent the bag from swinging.

On one of the sides or bars 8 of the V-shaped extension 4 is formed an eye 8', to which is pivotally connected a spring-retracted picking-jaw in the form of a rod or bar 9, the lower end of which is provided with an offset right-angularly-disposed arm 10, having formed on its end an eye 12, to which is connected the upper end of an operating-cord 13, which extends downwardly through guides 14 on the handle to within convenient reach of the operator.

When the cord 13 is pulled, the arm 10 will be drawn downwardly, thereby moving the rod or jaw 9 past the side bar 8 of the V-shaped extension 4, with which it coacts after the manner of a pair of shears. A bowed spring 15 is arranged on the frame 3 to retract the jaw 9 when the operating-cord is released, said spring having one end or arm connected to the side of the frame and the other end or arm slidably connected to the jaw 9, as shown, and between the ends is formed a coil which is engaged by the clip 5'.

In Figs. 1 and 2 the jaw 9 is arranged on the rear side of the extension and the right-angularly-formed arm of the same is offset and is disposed on the forward side of the extension, so that a shoulder 16 is formed, which when the jaw 9 and arm 10 are retracted by the spring the shoulder 16 will engage the side of the frame 3 and limit the opening movement of the jaw.

By reference to Fig. 2 it will be seen that the upper portion of the circular frame 3 is curved forwardly and the extension 4 then inclines backwardly and is disposed in rear of the upper portion of the bail 5. This formation or arrangement of the parts facilitates the engagement of the device with the fruit.

In Figs. 3 and 4 is shown a slightly-modified form of picker. In this instance the picking-jaw 18 is pivotally connected to the forward side of the V-shaped extension and the right-angularly-bent arm 19 on the lower end of the jaw is not offset, but is disposed in the same plane as the jaw. The opening movement in this instance is limited by a knot formed in the operating-cord 13 to engage the upper guide 14 on the handle, thereby preventing the cord from slipping through the guide, and thus holding the arm 19 from further upward movement. A guard bracket or frame 20 is arranged on the forward side of the V-shaped extension 4 and consists of a rod or bar having right-angularly-bent ends, which are secured to the side bar of the V-shaped frame, to which the jaw 18 is pivoted. In the latter form of picker the frame 3 is not curved forwardly at its upper end, the V-shaped extension 4, the bail 5, and the circular frame all being substantially in the same vertical plane. In using the picker the frame 3 is placed over the fruit and the V-shaped extension drawn down between the fruit and the branch to which it is attached. The cord is now pulled, which draws the arm of the picking-jaw downwardly and forces said jaw toward the side bar of the V - shaped frame, which action forces the fruit from the branch and causes the same to drop into the pocket or bag.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a fruit-picker, the combination with a handle, of a frame secured to the upper end of the same, an extension formed on the upper end of said frame, a bag-supporting bail arranged above said extension and secured to said frame, a bag or pocket secured to said bail and frame, and a picking device pivoted on said extension, substantially as described.

2. In a fruit-picker, the combination with a handle, of a frame secured to the upper end of the same, an extension formed on the upper end of said frame, a bag-supporting bail arranged above said extension and secured to said frame, a bag or pocket secured to said bail and frame, a picking-jaw pivoted to said extension and adapted to coact with one side of the same to remove the fruit from their branches and means for operating said pivoted jaw, substantially as described.

3. In a fruit-picker, the combination with a handle, of a frame secured to the upper end of the same, an extension formed on the upper end of said frame, a bag-supporting bail arranged above said extension and secured to said frame, a bag or pocket secured to said bail and frame, a spring-retracted picking-jaw pivoted to said extension and adapted to be moved into engagement with one side of the same to remove the fruit from their branches, means for actuating said picking-jaw, and means for limiting the opening movement of the same, substantially as described.

4. In a fruit-picker, the combination with a handle, of a frame secured to the upper end of the same, an extension formed on the upper end of said frame, a bag-supporting bail arranged above said extension and secured to said frame, a bag or pocket secured to said bail and frame, a spring-retracted picking-jaw pivoted to said extension and adapted to be moved into engagement with one side of the same, a right-angularly-disposed operating-arm formed on said jaw and offset from the same to engage the side of said frame and limit the opening movement of the jaw and an operating-cord connected to the end of said arm, substantially as described.

In testimony whereof I have hereunto set my hand in presence of two subscribing witnesses.

LE GRAND TERRY.

Witnesses:
Wm. E. Tew,
Edson A. Tilton.